United States Patent [19]
Tozawa

[11] Patent Number: 5,322,037
[45] Date of Patent: Jun. 21, 1994

[54] COLLAR FOR A CAT

[76] Inventor: Masashi Tozawa, 142-8, Satanaka-cho 6-chome, Moriguchi-shi, Osaka, Japan

[21] Appl. No.: 899,885

[22] Filed: Jun. 17, 1992

Related U.S. Application Data

[62] Division of Ser. No. 703,730, May 21, 1991, abandoned.

[30] Foreign Application Priority Data

May 23, 1990 [JP] Japan .................. 2-53945[U]
Mar. 29, 1991 [JP] Japan .................. 3-19579[U]

[51] Int. Cl.$^5$ ............................. A01K 27/00
[52] U.S. Cl. ................... 119/865; 119/863; 24/625; 24/662
[58] Field of Search .......... 119/106, 109, 96, 863, 119/865; 24/614, 615, 616, 625, 662, 664, 669

[56] References Cited

U.S. PATENT DOCUMENTS

| | | | |
|---|---|---|---|
| 2,612,139 | 9/1952 | Collins | 119/106 |
| 2,900,696 | 8/1959 | Bacon | 119/106 |
| 3,589,341 | 6/1971 | Krebs | 119/106 |
| 3,994,265 | 11/1976 | Banks | 119/106 |
| 5,144,725 | 9/1992 | Krauss | 24/625 |
| 5,176,106 | 1/1993 | Casto et al. | 119/106 |

Primary Examiner—John G. Weiss
Attorney, Agent, or Firm—Burns, Doane, Swecker & Mathis

[57] ABSTRACT

Slip prohibiting engaging portions provided in a female member and a male member elastically fit with each other in the crossing direction relative to a sliding and fitting direction when the female member and the male member are slid and fitted with each other to give a predetermined resistance when the female member and male member are pulled out.

13 Claims, 4 Drawing Sheets

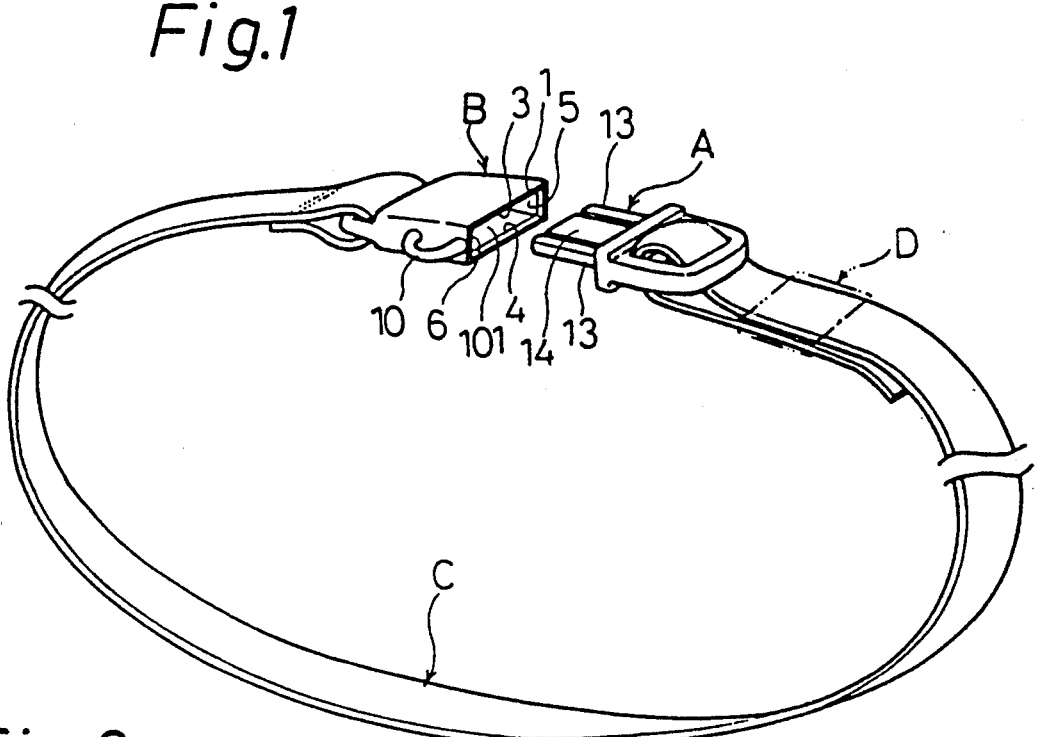
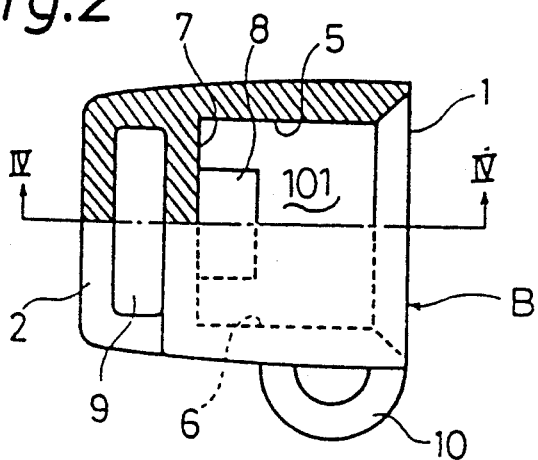
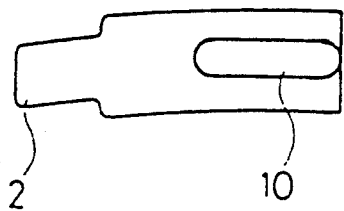
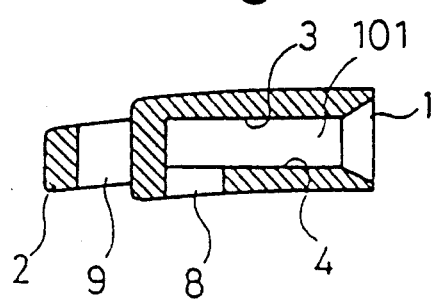

COLLAR FOR A CAT

This application is a divisional of application Ser. No. 07/703,730, filed May. 21, 1991, now abandoned.

BACKGROUND OF THE INVENTION

1. Technical Field of the Invention

The present invention relates to a collar for a pet, especially for a cat, and more particularly, to a collar for a cat which is designed so that a cat can get out of the collar and return safe even if the collar is caught by something in a narrow place or the like.

2. Description of Related Art

In the midst of recent pet boom represented by dogs and cats, the safety of the pet strongly desired throughout the world, not to mention the U.S.A. and European countries.

Especially for a cat, the following special considerations are of concern. A collar for a cat is generally used to attach a bell or an ornament thereto. However, since the cat has a tendency to pass through narrow places, sometimes the collar is caught by something, and it habitually happens that the cat can not get out of the collar and starves to death. Such an accident remarkably happens when a high-grade collar is used. In order to solve such troubles, it has heretofore been arranged to provide a part of a collar with an elastic portion so that the head of a cat may get out of the collar by expansion of a belt of the collar when it is caught by something.

In this case, however, if the elastic portion of the collar is arranged, for instance, by means of rubber, the neck of a cat is oppressed or excessively strangled if the elasticity of the rubber in the rubber section is strengthened which is not desirable. Moreover, the movement of a cat is restricted by the disposition of surrounding obstacles when the collar is caught by something, and even if the cat pulls the collar in the direction in which the collar can be expanded the cat can not get out of the collar in that direction. Conversely, if the elasticity of the rubber in the rubber section is weakened in order for the cat to be able to easily get out of the collar when the collar is caught by something, the collar looses during ordinary behavior of the cat.

SUMMARY OF THE INVENTION

A primary object of the present invention is to provide a collar for a cat which is capable of solving the conventional problems described above by improving a connecting structure of the collar.

Another object of the present invention is to provide a collar for a cat which is capable of fulfilling a connecting structure in a flat configuration suitable for a collar.

A further object of the present invention is to provide a collar for a cat wherein a connecting operation in a flat configuration can be made firmly with a desired force of engagement.

A still another object of the present invention is to provide a collar for a cat wherein an engaging section provided for obtaining an engaging force for a connecting operation can be easily formed.

A still further object of the present invention is to provide a collar for a cat which is provided with a connecting structure capable of keeping necessary engaging and disengaging function for over a long period of time.

These and other objects and features of the present invention will become more apparent from the following description taken in conjunction with the accompanying drawings which illustrate specific embodiments of the invention.

BRIEF DESCRIPTION OF THE DRAWINGS

FIG. 1 is a perspective view showing an embodiment of the present invention.

FIG. 2 is a cross-sectional plan view showing a part of a female member in FIG. 1.

FIG. 3 is a side view of the female member in FIG. 1.

FIG. 4 is a IV—IV sectional view in FIG. 2.

It is to be noted that like parts and marks are designated by like parts and marks throughout each embodiment, and repeated descriptions will be omitted.

DESCRIPTION OF THE PREFERRED EMBODIMENTS

Embodiments of the present invention will now be described hereinafter referring to accompanying drawings.

FIGS. 1 through 8 show a first embodiment of the present invention.

Figure 5:
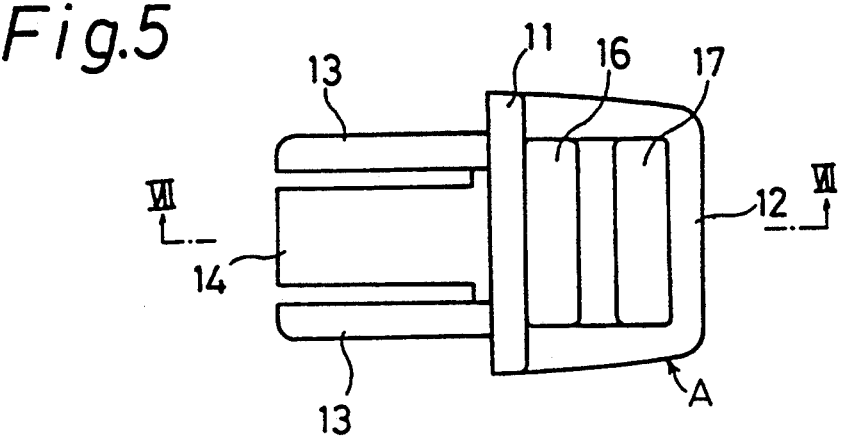
FIG. 5 is a plan view showing a male member in FIG. 1.
Figure 6:
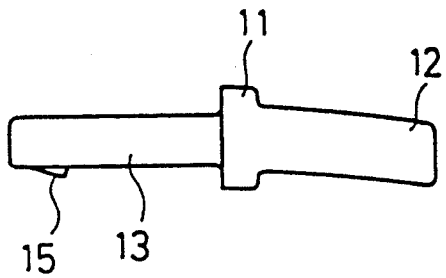
FIG. 6 is a side view showing the male member in FIG. 1.
Figure 7:
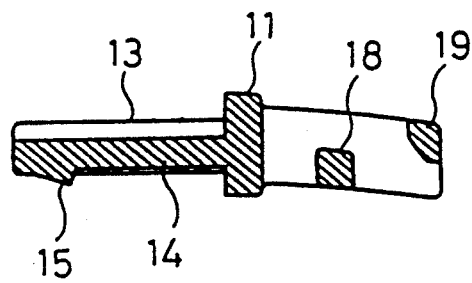
FIG. 7 is a VII—VII sectional view in FIG. 5.

As illustrated in FIG. 1, a collar comprises a male member A, a female member B and a belt C. One end of the belt C is run through a connecting hole 9 of the female member B and is folded back to fix it by means of stitching or the like. The other end of the belt is passed through two belt connecting holes 16, 17 provided in the male member A and is folded back so as to be fixed by a fixing member D by adjusting a length of the belt, i.e. a diameter of the collar. By connecting the male member A with the female member B, the belt forms a loop to be used as a collar. The female member B shown in FIGS. 2 through 4 and the male member A in FIGS. 5 through 7 are made of an elastic material of synthetic resin such as polycarbonate.

The female member B is formed of a flat hollow shape in rectangular section. At one end, there is formed an opening 1 to engage with the male member A in a hollow portion 101, and at the other end thereof, there is formed a connecting section 2 which is provided with a long hole 9 for connecting the belt C.

The hollow portion 101 is surrounded by long side walls 3, 4 facing each other at upper and lower portions, short side walls 5, 6 facing each other at right and left sides and an inner wall 7 on the side of the belt connecting section, and one side is opened by the opening 1. At the central part of the long wall 4 adjacent to the inner wall 7, there is provided an engaging concave section 8 which passes through the outside surface.

In the male member A, there is formed a belt connecting section 12 on one side of a flat base 11 in the shape of a rectangular plate, and on the other side thereof, a pair of both-side guides 13 and an engaging piece 14 are protruded. The dimensions between both outer sides of the pair of both-side guides 13 and the height of the guides 13 are arranged so as not to be shaky when the flat base slides into the female member B along the hollow portion 101.

There is provided a gap between the upper surface of the engaging piece 14 and the upper long side wall 3 of the female member B, and the under surface of the engaging piece 14 is positioned so as to be slidable relative to the lower long side wall 4 of the female member B. An engaging convex portion 15 is further provided on the tip portion of the engaging piece 14. As shown in FIG. 7, the engaging convex portion 15 is gently inclined toward the inserting direction to the female member B and is abruptly inclined toward the pulling direction.

When the male member A is connected with the female member B, the both-side guides 13 and the engaging piece 14 of the male member A are inserted from the opening 1 of the female member B so that the both-side guides 13 slide on the short side walls 5, 6 in the hollow portion 101 of the female member B to guide for insertion. At this stage, the engaging convex portion 15 at the tip of the engaging piece 14 hits the long side wall 4 in the hollow portion 101 and the inserting operation is obstructed. However, since the opposite side of the engaging convex portion 15 is formed in a manner to have a gap relative to the long side wall 3, the engaging piece 14 is bent by running onto the long side wall 3 to thereby enable insertion.

Figure 8:
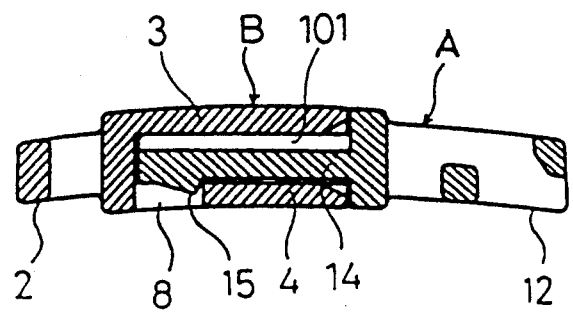
FIG. 8 is a cross-sectional view showing how the male member and the female member in FIG. 1 are connected.

When the base 11 of the male member A is inserted to come in contact with the opening 1 of the female member B, the engaging convex portion 15 is engaged with the engaging concave portion 8 bored in the long side wall 4 to complete an engaging action. As illustrated in FIG. 8, the engaging convex portion 15 engaged with the engaging concave portion 8 is provided with an abrupt slanting surface in the pulling direction. Accordingly, even if the force which is generated in an ordinary behavior of a cat with the collar is added in the pulling direction, the engaging convex portion 15 does not come off since there is provided an engaging force of the abrupt slanting surface of the engaging convex portion 15 with the engaging concave portion 8. However, when the collar is caught by something and a strong force is added, for instance, by the violent action of a cat the pulling force surpasses the engaging force of the engaging convex portion 15 and the engaging concave portion 8, and it bends the engaging piece 14 to loosen the engaging convex portion 15 from the engaging concave portion 8. The connection of the male member A with the female member B is thereby released to loosen the loop of the collar so that the cat under an accidental situation can be released.

FIGS. 9 through 15 illustrate a second embodiment of the present invention.

Figure 9:
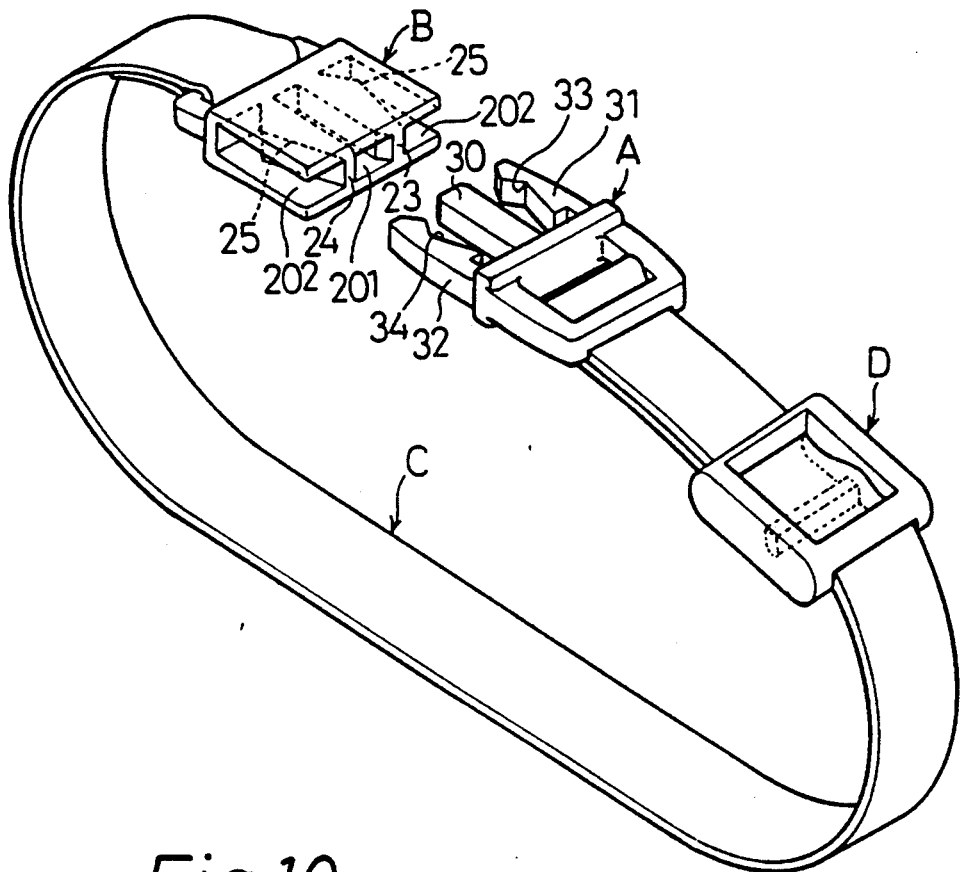
FIG. 9 is a perspective view showing another embodiment of the present invention.

As shown in FIG. 9, a collar comprises a male member A, a female member B, a belt C and a fixing member D. One end of the belt C is run through a connecting hole 9 of the female member B and is folded back to fix it by means of stitching or the like. The other end of the belt is passed through two belt connecting holes 16, 17 provided in the male member A and is folded back so as to be fixed by a fixing member D by adjusting a length of the belt, i.e. a diameter of the collar. By connecting the male member A with the female member B, the belt forms a loop to be used as a collar.

Figure 10:
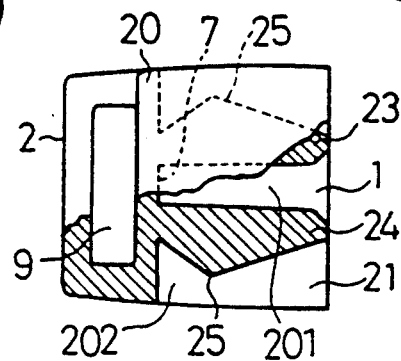
FIG. 10 is a cross-sectional plan view showing a part of the female member in FIG. 9.
Figure 11:
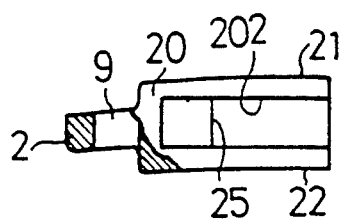
FIG. 11 is a cross-sectional side view showing a part of the female member in FIG. 9.
Figure 12:
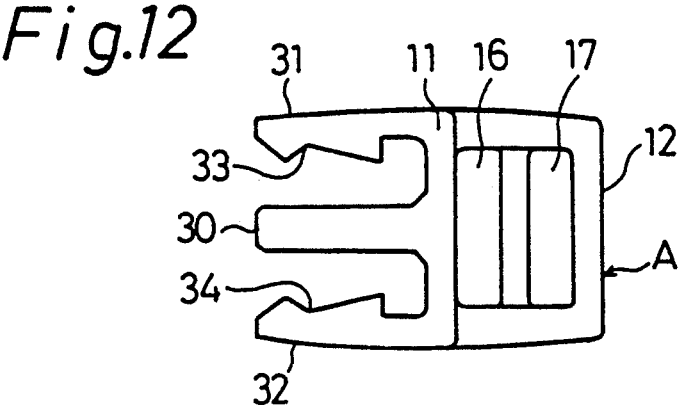
FIG. 12 is a plan view showing the male member in FIG. 9.
Figure 13:
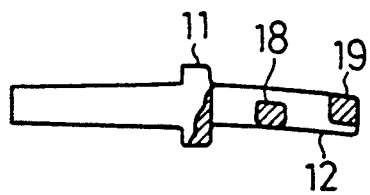
FIG. 13 is a cross-sectional side view showing a part of the male member in FIG. 9.

The female member B shown in FIGS. 10 and 11 and the male member A shown in FIGS. 12 and 13 are made of an elastic material of synthetic resin such as polycarbonate.

In the female member B, there is formed a connecting portion 2 provided with a long hole 9 for connecting the belt C on one side of a base 20 in the shape of a parallel flat rectangular plate, and on the other side of the base 20, there are formed two flat plates 21, 22 opposite to each other which constitute an external shape of a flat female member B. At the central portion between two of the flat plates 21 and 22, there is formed a hollow portion 201 surrounded by the flat plates 21, 22 which are vertically positioned opposite to each other, the side walls 23, 24 which connect the flat plates 21, 22 with the base 20 as an inner wall 7, and one side which is opened by an opening 1.

The side walls 23, 24 on the side of the hollow portion 201 are made smooth, however, on the outside of the side walls 23, 23, there are formed engaging convex portions 25 in groove 202 which lie between the flat plates 21 and 22. As shown by a section in FIG. 10, the engaging convex portion 25 is gently inclined upwardly toward an inserting direction from the opening 1, while it is abruptly inclined downwardly toward in the pulling direction to the inner wall 7. The upper and lower sides of the engaging convex portion 25 lie between the flat plates 21 and 22, and the engaging convex portion 25 and the flat plates 21, 22 guide the engaging pieces 31, 32 of the male member A, which will be described later, to engage with each other.

The male member A is provided with a belt connecting portion 12 on one side of a flat base 11, while on the other side, there are protruded a guide 30 at the central part with a pair of engaging pieces 31, 32 on both sides. The lateral and vertical dimensions of the guide 30 are arranged not to be shaky when it slides into the female member B along the hollow portion. The dimensions of the engaging pieces 31, 32 are arranged to smoothly engage with a groove 202 and not to be shaky when they slide into and engage with the portion of the flat plates 21 and 22 where the engaging convex portion 25 is caught in between.

Both outside surfaces of the engaging pieces 31 and 32 are made smooth in conformity with the shapes of the flat plates 21, 22, however, at the basic portion of the base 11, the thickness in the lateral direction are made thin so that the engaging pieces 31 and 32 can be elastically changed easily. Inside the tip portion of the engaging pieces 31, 32, there are formed engaging concave portions 33, 34 which engage with the engaging convex portions 25 of the female member B.

Inside the tip portions of the engaging pieces 31, 32, there are also formed slanting surfaces in a manner to have the thickness of the tip thinner toward the tip from the midway of the slanting surfaces of the engaging concave portions 33, 34.

When the male member A is connected with the female member B, the guide 30 and the pair of the engaging pieces 31 and 32 of the male member A are inserted from the side of the opening 1 of the female member B so that the guide 30 slides on the flat plates 21 and 22 and the side walls 23, 24 which connect the flat plates 21 and 22 in the hollow portion of the female member B to guide for insertion. At this stage, the tips of the pair of the engaging pieces 31 and 32 hit the side walls 23 and 24 in the hollow portion 201 and an inserting action is obstructed. However, since the slanting surface provided inside the tip portions of the engaging pieces 31, 32 is arranged in a manner to make the thickness of the tip portion thinner toward the tip, with the gentle slanting surface which is provided outside the tip portion of the side walls 23, 24 of the female member B, the engaging pieces 31, 32 are bent by a gentle resistance of the slanting surface of the engaging pieces 31, 32 to thereby enable insertion.

When the base 11 of the male member A is inserted to come in contact with the opening 1 of the female member B, the engaging concave portion 33, 34 of the male member A is engaged with the engaging convex portion 25 of the female member B to complete an engaging action.

Figure 14:
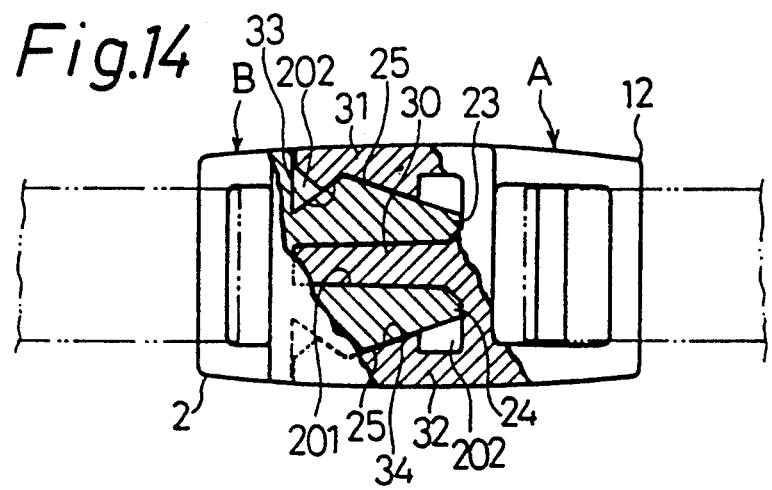
FIG. 14 is a cross-sectional plan view showing how the male member and female member in FIG. 9 are connected.
Figure 15:
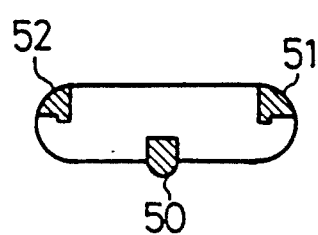
FIG. 15 is a sectional view showing a fixing member in FIG. 9.

As illustrated in FIG. 14, the engaging concave portions 33, 34 which engage with the engaging convex portions 25 are provided with an abruptly inclined surface in the pulling direction. Accordingly, even the force which is generated in an ordinary behavior of a cat with the collar is added in the pulling direction, the engaging portion does not come off since there is provided an engaging force of the abruptly inclined surface of the convex portion 25 and the abruptly inclined surfaces of the engaging concave portions 33, 34. However, when the collar is caught by something and a strong force is added, for instance, by violent action of a cat, the pulling force surpasses the engaging force of the engaging convex portion 25 and the engaging concave portions 33, 34, and it bends the engaging pieces 31, 32 to loose the engaging convex portion 25 from the engaging concave portions 33 and 34. The male member A and the female member B are thus disconnected to release the loop of the collar so that the cat under an accidental situation can be released.

The collar for a cat described in the above embodiments is simple in construction and easy to manufacture. Since the female member is made flat, the male member to fit on the female member is also flat. Consequently, the thickness of the connecting section where the male and female members are fitted with each other can be made substantially as thin as the thickness of the belt. By maintaining a firm state of fitting between the fitting hole and the guide portion, a sufficient space can be secured for the engaging pieces to elastically engage and disengage therein. The shapes of the engaging pieces of the male member and its engaging protrusion, and also a degree of elastic change at the time of engagement can thus be freely designed to obtain a desired engaging force.

Especially the collar for a cat described in the second embodiment of the present invention may be constructed in any shape since the engaging portion provided in the female member is formed in a concave portion which is opened outwardly. The engaging portion can be designed more freely than that of the first embodiment of the present invention, and a more accurate engaging force can be obtained.

In the second embodiment of the present invention, the female member and the male member are engaged with each other by their slanting surfaces, and therefore, even if they are repeatedly engaged and disengaged, the shapes are not changed and a predetermined engaging force can be maintained over a long period of time. Further, an engaging force can be easily set by arranging an angle of inclination relative to the direction the slanting surfaces slide and engage. The method of engaging the slanting surfaces may also be applied to the first embodiment of the present invention.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A collar for a cat, comprising:
   a belt;
   a female member connected to one end of the belt;
   a male member connected to the other end of the belt;
   fitting portions provided on the female member and the male member for being fitted with each other, said fitting portions comprising a hollow portion formed at a central portion of the female member and a guide which is formed at a connecting end of the male member for being slid and fitted into the hollow portion; and
   slip prohibiting engaging portions formed in the female member and the male member to be brought into fitting engagement with each other when the fitting portions are fitted with each other, said slip prohibiting engaging portions being comprised of an engaging portion provided on outwardly facing surfaces of two spaced apart side walls on the female member and engaging pieces which are individually positioned on opposite sides of the guide of the male member, said side walls being positioned between two flat plates and said hollow portion being bordered by said two side walls and said two flat plates, each of said engaging pieces elastically engaging the engaging portion on one of the side walls when the guide is slid and fitted into the hollow portion.

2. The collar for a cat as defined in claim 1, wherein the engaging portion on each side wall and the engaging pieces include slanting surfaces, said engaging portion on the side walls and said engaging pieces coming into engagement with each other at their slating surfaces.

3. The collar for a cat as defined in claim 1, wherein the engaging portion on the side walls and the engaging pieces are provided with angular engaging surfaces in the direction in which the hollow portion and guides are slid and fitted with one another.

4. The collar for a cat as defined in claim 3, wherein the engaging surface of the engaging portion is a convex portion, and the engaging surface of the engaging piece is a concave portion.

5. The collar for a cat as defined in claim 2, wherein the slanting surfaces on each engaging portion differ in angle of inclination and wherein then slanting surfaces on the engaging pieces differ in angle of inclination.

6. The collar for a cat as defined in claim 2, wherein the engaging portion on each side wall includes two slanting surfaces, one of the two slanting surfaces on each side wall being more steeply inclined than the other slanting surface.

7. A collar for an animal, comprising:
a belt having first and second end portions;
a male member connected to the first end portion of the belt, said male member including a base and two engaging pieces connected to the base, and a guide positioned between the two engaging pieces and connected to the base;
a female member connected to the second end portion of the belt, said female member receiving the male member when the male member is inserted into the female member in an axial direction, said female member including a base and two side walls connected to the base of the female member, said engaging pieces of the male member including means for engaging the side walls with an engaging force that is sufficient to prevent the engaging pieces from being disengaged from the side walls upon the application of a force to the male and female members in the axial direction that is less than the engaging force when the male member is received within the female member, and for allowing the engaging pieces to be disengaged from the side walls when a force greater than the engaging force is applied to the male and female members in the axial direction, said means for engaging including two slanting surfaces formed on each of the engaging pieces and each of the side walls, the slanting surfaces of each engaging piece being engaged with the slanting surfaces on one of the side walls when the male member is received in the female member, the two slanting surfaces on each engaging piece including first and second slanting surfaces, the first slanting surface being positioned between the base of the male member and the second slanting surface, the second slanting surface being more steeply inclined than the first slanting surface.

8. The collar according to claim 7, wherein said two engaging pieces are flexible.

9. The collar according to claim 7, wherein said means for engaging includes an engaging concave portion formed on each of the engaging pieces and an engaging convex portion formed on each of the side walls, each engaging concave portion engaging one of the engaging convex portions when the male member is received within the female portion.

10. The collar according to claim 7, wherein said side walls on the female member are spaced apart to define a hollow portion therebetween, the guide on the male member being positioned in the hollow portion when the male member is received in the female member.

11. The collar according to claim 10, wherein the female member includes two spaced apart plates connected to the base of the female member, said side walls being connected to the plates.

12. The collar according to claim 7, wherein the two slanting surfaces on each of the engaging pieces and each of the side walls include one slanting surface that is more steeply inclined than the other slanting surface.

13. The collar according to claim 7, wherein the two slanting surfaces on each side wall include first and second slanting surfaces, the first slanting surface being located between the base of the female member and the second slanting surface, the first slanting surface being more steeply inclined than the second slanting surface.

* * * * *